(12) United States Patent
Deforche et al.

(10) Patent No.: US 10,849,288 B2
(45) Date of Patent: Dec. 1, 2020

(54) CULTIVATION SYSTEM

(71) Applicant: GREEN PRODUCTION SYSTEMS BVBA, Mechelen (BE)

(72) Inventors: Frans Andre Victor Cornelius Deforche, Mechelen (BE); Olivier Luc Henriette Frans Deforche, Mechelen (BE)

(73) Assignee: GREEN PRODUCTION SYSTEMS BVBA, Mechelen (BE)

( * ) Notice: Subject to any disclaimer, the term of this patent is extended or adjusted under 35 U.S.C. 154(b) by 313 days.

(21) Appl. No.: 15/739,477

(22) PCT Filed: Jun. 28, 2016

(86) PCT No.: PCT/BE2016/000029
§ 371 (c)(1),
(2) Date: Dec. 22, 2017

(87) PCT Pub. No.: WO2017/000045
PCT Pub. Date: Jan. 5, 2017

(65) Prior Publication Data
US 2018/0325054 A1 Nov. 15, 2018

(30) Foreign Application Priority Data

Jun. 30, 2015 (BE) .................................. 2015/5410

(51) Int. Cl.
*A01G 31/04* (2006.01)
*A01G 9/14* (2006.01)

(52) U.S. Cl.
CPC ........... *A01G 31/042* (2013.01); *A01G 9/143* (2013.01); *Y02A 40/25* (2018.01); *Y02P 60/21* (2015.11)

(58) Field of Classification Search
CPC ...... A01G 31/042; A01G 31/04; A01G 31/02; A01G 31/045
See application file for complete search history.

(56) References Cited

U.S. PATENT DOCUMENTS

| 1,793,626 A | 2/1931 | McCormich |
| 3,571,971 A * | 3/1971 | Broersma ............... A01G 9/081 |
| | | 47/1.01 R |

(Continued)

FOREIGN PATENT DOCUMENTS

| EP | 0133494 A2 | 2/1985 |
| EP | 0514558 A1 | 11/1992 |

(Continued)

OTHER PUBLICATIONS

PCT International Search Report and Written Opinion; PCT/BE2016/000029, dated Nov. 8, 2016.

*Primary Examiner* — Kristen C Hayes

(57) ABSTRACT

A system for cultivating a crop includes a sowing unit for sowing at least two crop seeds per substrate unit; a transfer unit for transferring a plurality of substrate units from a first zone to a second zone; a harvesting unit for harvesting the crop; a first transport system in the first zone for transporting substrate units from the sowing unit to the transfer unit; and a second transport system in the second zone for transporting substrate units from the transfer unit to the harvesting unit. The sowing unit can sow the at least two crop seeds in the substrate unit with a predetermined mutual distance and orientation, wherein the first and second transport system and the transfer unit are configured to respectively transport and transfer the plurality of substrate units such that the substrate units display a predetermined orientation progression from the sowing unit to the harvesting unit.

10 Claims, 5 Drawing Sheets

(56) References Cited

U.S. PATENT DOCUMENTS

| | | | | | |
|---|---|---|---|---|---|
| 3,799,078 | A | * | 3/1974 | Blackmore | A01C 11/025 111/100 |
| 3,824,736 | A | * | 7/1974 | Davis | A01G 7/045 47/17 |
| 4,408,549 | A | * | 10/1983 | Qvarnstrom | A01C 11/025 111/100 |
| 4,703,704 | A | * | 11/1987 | Mielke | A01C 7/044 111/179 |
| 5,353,723 | A | * | 10/1994 | Tesch, Jr. | A01C 11/025 111/105 |
| 5,445,089 | A | * | 8/1995 | Houng | A01C 11/025 111/105 |
| 9,363,957 | B2 | * | 6/2016 | Cheng | A01G 31/02 |
| 9,795,089 | B2 | * | 10/2017 | Kantola | A01G 31/00 |
| 10,004,187 | B1 | * | 6/2018 | Van Wingerden | A01G 31/06 |
| 2014/0115960 | A1 | * | 5/2014 | Kantola | A01G 9/047 47/66.7 |
| 2018/0007850 | A1 | * | 1/2018 | Dufresne | B65G 1/0407 |

FOREIGN PATENT DOCUMENTS

| | | | | |
|---|---|---|---|---|
| FR | 2577752 | A2 | 8/1986 | |
| GB | 2026831 | A | 2/1980 | |
| NL | 8900160 | A | 8/1990 | |
| WO | WO9305643 | A1 | 4/1993 | |
| WO | WO-2016125296 | A1 * | 8/2016 | A01G 9/12 |

* cited by examiner

CULTIVATION SYSTEM

This is a national stage application filed under 35 U.S.C. 371 of pending international application PCT/BE2016/000029, filed Jun. 28, 2016, which claims priority to Belgian patent application BE 2015/5410, filed Jun. 30, 2015, the entirety of which applications are incorporated by reference herein.

The present invention relates to a system for cultivating a crop. The invention relates particularly to a system for cultivating a crop by means of hydroponics.

Hydroponics is the growing of plants in water to which the necessary nutrients have been added. It is a cultivation method which is applied increasingly often, not only for house plants but also for cultivation of vegetables, such as tomato, chicory, lettuce and other crops, in a protected space (glasshouse or building) or outside. An important advantage of hydroponics relative to soil cultivation is that water and nutrients can be dosed in simple and precise manner. Soil-bound diseases usually do not occur, and there is thereby much less need for treatment with agents against disease.

Cultivating a crop in hydroponics typically comprises multiple stages. A first stage is the sowing and germination stage. Different units of medium (substrate) are first placed, optionally packaged (soil block (root ball), potting compost, pot, net, . . . ), in a receptacle or tray. One or more seeds are then placed in or on the medium. The number calculated per $m^2$ varies from 200 to more than 1000, depending on the dimensions of the medium and the type of seed. The germination stage takes place in a germination chamber (germination cell). Temperature and moisture are mainly controlled here in order to bring about optimal germination of de seed. After germination, the receptacles/trays are displaced from the germination space to the glasshouse, where the plants can grow to a determined size. This is the raising stage. After the raising stage, the plants are usually carried from the plant grower to the market gardener. At the market gardener with a hydroponics system in gutters the plants will usually be transplanted to a tray. One density of 100 per $m^2$ is usually applied. This stage is referred to as the extended raising stage. Water, optionally with fertilizers, is supplied onto the tray via overhead irrigation. The extended raising stage is followed by the cultivation stage. In the cultivation stage the plants are typically placed in gutters which are provided to slide apart as the crop grows, such that the crop has space to reach full growth while the surface area is utilized optimally.

WO 94/07354 describes a system of movable gutters for cultivating a crop. This system is typically used in the cultivation stage. WO 94/07354 describes a system for cultivating a crop with a guide for guiding a plurality of gutters in a predetermined area, wherein each gutter is provided to contain a plurality of crop units of a crop and wherein the guide is provided to guide the gutters in a first direction extending from a first edge to a second edge of the area, wherein the guide is further provided to gradually increase the distance between adjacent gutters in said direction, such that the number of crop units per $m^2$ in the area substantially decreases from the first edge to the second edge. A surface area in a glasshouse can in this way be utilized optimally when hydroponics is applied, wherein the advantages of hydroponics relative to soil cultivation are described above.

It is an object of the present invention to further optimize the process of cultivating a crop.

The invention comprises for this purpose a system for cultivating a crop, wherein the system comprises:

a sowing unit for sowing at least one crop seed per substrate unit;
a guide for guiding a plurality of gutters, wherein each gutter is provided to contain a plurality of substrate units with an intermediate distance in the longitudinal direction of the gutter; characterized in that the sowing unit is provided to sow the at least one crop seed in the substrate unit and wherein the substrate unit is situated in the gutter during germination of the at least one crop seed. The sowing unit will preferably be provided here to sow the at least one crop seed in the substrate unit when the substrate unit is situated in the gutter.

The invention provides a system wherein plants can be cultivated from start to finish at the grower or market gardener. This allows plants to be cultivated from seed to harvestable plant in one space or at one location. The process of cultivation can hereby be automated and optimized in a number of ways.

An unexpected and surprising advantage has surfaced in the sowing in gutters or the sowing close to gutters and placing of the substrate units in gutters so that the seed can germinate in the gutters. This is because this allows the crop to be contained in gutters during substantially the whole cultivation process. It has been ascertained in transplanting or transferring of the plants from one gutter to another gutter that the plants experience no appreciable stress because the roots are provided in the same way with a nutrient solution which flows through the gutters. This is in contrast to the transplanting of plants which have grown in a tray or receptacle to a gutter for further raising. When plants from a receptacle or tray are planted in a gutter, the plant experiences stress because the manner of watering and fertilizing is different. The plant in a tray field is in practice watered a maximum of twice per day in summer, and is in winter even watered only a few times per week. This discontinuous watering results in a different type of root (an aerial root) being formed. The tray plant which is transplanted into a gutter has to adapt to this change from discontinuous (from several times per week to a maximum of twice per day) to intermittent watering (from six times per day in winter to more than double that in summer), which causes stress (production of new roots), whereby the rate of growth of the plant suffers a setback. Because the seed can in the system according to the invention already germinate when the substrate unit is situated in the gutter, is preferably sown directly in gutters and is preferably transferred from one gutter to another gutter, the area surrounding the plant and root remains substantially the same and the plant will experience no appreciable stress. In the case of tray plants a lag in growth of a few days can easily occur.

The plurality of gutters are preferably situated in a predetermined area, wherein the guide is provided to guide the gutters in a first direction which extends from a first edge to a second edge of the area, wherein the area comprises a first zone adjacent to the first edge and a second zone adjacent to the second edge, wherein the system further comprises:

a harvesting unit for harvesting the crop;
a transfer unit for transferring a plurality of substrate units from the first zone to the second zone;
wherein the first zone operatively connects the sowing unit and the transfer unit at least partially;
wherein the second zone operatively connects the transfer unit and the harvesting unit at least partially.

By applying this system plants need no longer be transported by road, whereby the plants experience less stress. The whole system can be built at one location, whereby the crop need not endure any changes in climate. The crop can hereby grow optimally. Because water and nutrients flow through the gutter, the crop will further grow uniformly over the whole length of the gutter. In a first embodiment the sowing unit is formed at the position of the first edge so that the sowing unit is situated in the predetermined area. In a second embodiment a further zone, for instance a raising zone, is formed preceding the first zone. In this second embodiment the sowing unit and the transfer unit are operatively connected to each other by the combination of the raising zone and the first zone.

Because the area with gutters now comprises two zones and the crop units in the first zone are positioned considerably closer together in the gutters, it is possible in this first zone to optimally fill the available surface area with plants which are considerably smaller than in a prior art gutter system. The gutters in the first zone move apart as the small plant grows, until the transition location between the first zone and the second zone is reached. The plants or crop units are then at least partially transplanted to the second zone, where the intermediate distance in the longitudinal direction of the gutter between the crop units is considerably greater than in the first zone. The plants are hereby given considerably more space in the longitudinal direction of the gutter, and the distance between adjacent gutters can therefore be considerably reduced. It is noted here that the plants of the mutually adjacent gutters are preferably positioned in a triangular pattern. The gutters can then be moved apart in the second zone as the crop grows, such that the crop can be harvested when the gutters reach the second edge and the crop has then also reached full growth.

Tests have shown that constructing the system for cultivating a crop in this way enables considerable optimization of the extended raising stage as well as the cultivation stage. The plants are traditionally placed on trays (in receptacles) in the extended raising stage, typically at the market gardener. Crop units in such receptacles or trays are considerably more difficult to provide with water and nutrients than crop units in gutters. Because the trays or receptacles are irrigated from above, the distribution of water and nutrients is further not homogeneous. This often causes crop units located at the edge of a zone to dry out, which results in losses. Watering the crop by means of irrigation is further considerably less efficient than watering in a gutter. It has also been found that the roots of the crops grow considerably less well on the sides of tray or receptacle zones than in the gutter, this because they are often subjected to drying out and to light in the receptacle or tray. The root of a tray plant is not the same root as a root which is continuously wet owing to the nutrient solution (water with fertilizers) flowing intermittently through the gutter. The intermittent watering is fully computer-controlled, and once the start time and end time have been set (a combination of time-based starts and light-based starts (until a threshold value of the light is reached)) the times at which the plants must receive nutrient water need not be given any more thought. In the tray (receptacle) zone this is completely different and cannot be automated, and the area surrounding the root constantly varies between wet and dry area.

Because the system according to the invention allows relatively small plants to be placed in gutters in an optimal manner, plants coming from the raising stage can be placed directly in gutters. When these plants are placed in the gutters, watering can take place in optimal manner, roots of the plants can develop properly because they are subjected much less to drying air (and also light), and no losses will occur due to uneven or irregular watering. Along the transition from the first to the second zone at least part of the plants are transplanted, wherein the intermediate distance of adjacent plants in a gutter is considerably greater.

The stepwise increase in intermediate distance between adjacent plants in a gutter is at least partially compensated in that the distance between adjacent gutters in the second zone is considerably smaller at the position of the transition than the distance between adjacent gutters in the first zone at the position of the transition. The surface area remains optimally utilized hereby.

The sowing unit is preferably configured to sow at least two crop seeds in the substrate unit with a predetermined mutual distance and orientation, wherein the gutters and the transfer unit are configured to respectively transport and transfer the plurality of substrate units in a manner such that the substrate units display a predetermined orientation progression from the sowing unit to the harvesting unit.

Because the sowing unit sows the plurality of crop seeds at a distance from each other in the substrate unit, the plants will also germinate and grow at a distance from each other in the substrate unit. By further also predetermining the orientation of the plurality of crop seeds, wherein orientation preferably relates to the relative position of the crop seeds relative to the geographical north pole, the amount of light received by each plant can be influenced. This makes no difference whatsoever during germination because there are no shadows yet. It is only during further development that the effect of shadow comes into play. The plant which is positioned due north relative to the other will receive less light and will grow less quickly. The invention is thereby based on the insight that when a plurality of crop seeds are sown in one substrate unit, each crop seed will produce a plant after germination. The plurality of plants in one substrate unit are here together referred to as a crop unit. The plurality of plants can be of the same type or of different types. If the plants are of the same type, they will typically also have the same growth curve, at least when they receive the same amount of light. The orientation of crop seeds of the same type in a substrate unit is therefore aimed at allowing the resulting plants to receive the same amount of light while taking into consideration the position of the sun, i.e. the plants are sown east-west in the substrate. The plurality of plants can also be of a different type. Tricolour lettuce is thus for instance produced as crop unit, wherein three types of lettuce are sown in one substrate unit. Different types of plant typically have different growth curves, wherein the one plant tends to grow more quickly than the other plant. They usually also have different colours. The UV rays of the sun will enhance the red colour. The orientation of crop seeds of different types of crop in a substrate unit is aimed at orienting plants which grow more quickly more toward the north in the substrate unit, so that they do not take light away from the plants which grow more slowly. It is best that plants which have more difficulty discolouring red are positioned in the direction wherein the plant can receive the most solar rays. Tests have shown that sowing crop seeds in a substrate unit with a predetermined distance between the seeds and with a predetermined orientation can have a considerable effect on the growth of the plants. This orientation is adhered to from sowing to harvesting, optionally with predetermined orientation changes, so that the process for cultivating the crop is optimized.

The orientation progression preferably describes the relative orientation of the substrate units during the transporting and transferring relative to the predetermined orientation. In a simple embodiment of the invention the orientation is determined during sowing, and this orientation is adhered to unchanged until the crop is harvested. This means that the orientation progression sets out a change of 0 degrees relative to the predetermined orientation during transport and transferring. In some situations, it may however also be advantageous to change the orientation in predetermined manner during transport and/or transferring. It can thus for instance be advantageous to rotate the substrate units over 90° in one direction during transferring so that the orientation is changed.

The at least two crop seeds preferably correspond to crops with different predetermined growth curves (and colours), wherein the crop seed with the slowest growth curve is oriented more toward the south in the substrate unit by the sowing unit. As explained above, this will result in the plant which grows more quickly taking away less light from the plant which grows more slowly.

The at least two crop seeds preferably comprise three crop seeds which are sown substantially in an isosceles triangle in a substrate unit by the sowing unit, wherein the triangle displays the predetermined orientation.

The guide preferably comprises a drive for moving the gutters in the first direction, wherein the drive is provided to change the distance between adjacent gutters in said direction. Such a drive can be formed in different ways, for instance by a robot, or by a drive rod or pull rod or drive chain with catches which are placed at a mutual distance corresponding to the distance between the gutters. One or more of such drives can be provided here, wherein a plurality of drives is for instance each time provided to drive one segment of the area.

Each gutter preferably comprises a plurality of means for containing a crop unit, this plurality of means having predetermined intermediate distances in the longitudinal direction of the gutter. The gutters are here preferably substantially tubular or U-shaped in cross-section with a cover (lid), wherein the plurality of means are formed as openings in the tube or cover, wherein each opening is formed to contain one or more crop units such that the medium and roots of the crop unit are situated substantially under the cover while leaves of the crop unit are situated substantially above the cover. This gutter construction is found to have a number of advantages, the intermediate distance between adjacent crop units is on the one hand predetermined and can thus be optimized. The cover will on the other hand ensure that less light reaches the roots of the crop units, so that these roots can grow. The cover further ensures that water in the gutter does not evaporate directly from the gutter.

The gutters are preferably placed in draining manner and the system comprises at the position of an end of the gutters a water dosing system and at the position of the other end of the gutters a water collecting system, such that the nutrient water flows through the gutters in controlled manner through the use of the system. The water collecting system is more preferably operatively connected to the water dosing system (for instance by a collecting tank), such that substantially all nutrient water can be recuperated. A closed circuit in which the water with the nutrients flows is obtained in this way. This allows for water and fertilizers to be handled highly efficiently and for water to leave only through evaporation, and fertilizers through uptake by the plant.

A plurality of water dosing systems and a plurality of water collecting systems are preferably provided such that a different quantity of water and/or water with different properties can be supplied to various gutters. This plurality of nutrient water dosing systems and collecting systems can then be placed in predetermined segments of the area so that the nutrient water (water with fertilizers) can be optimized depending on the growth stage which the crop is in. It will be apparent here that small plants have different needs than large plants.

The invention further relates to a method for cultivating a crop, wherein the method comprises the following steps of:
  sowing at least one crop seed per substrate unit by means of a sowing unit;
  guiding a plurality of gutters by means of a guide, wherein each gutter is provided to contain a plurality of substrate units with an intermediate distance in the longitudinal direction of the gutter;
characterized in that the sowing unit is provided to sow the at least one crop seed in the substrate unit and wherein the substrate unit is situated in the gutter during germination of the at least one crop seed. The sowing unit is preferably provided to sow the at least one crop seed in the substrate unit when this is situated in the gutter.

The plurality of gutters are preferably situated here in a predetermined area, wherein the guide is provided to guide the gutters in a first direction which extends from a first edge to a second edge of the area, wherein the area comprises a first zone adjacent to the first edge and a second zone adjacent to the second edge, wherein the method further comprises of:
  harvesting the crop by means of a harvesting unit;
  transferring a plurality of substrate units from the first zone to the second zone by means of a transfer unit;
  wherein the first zone operatively connects the sowing unit and the transfer unit at least partially;
  wherein the second zone operatively connects the transfer unit and the harvesting unit at least partially.

The invention will now be further described on the basis of an exemplary embodiment shown in the drawing.

In the drawing.

The same or similar elements are designated in the drawing with the same reference numerals.

Figure 1:
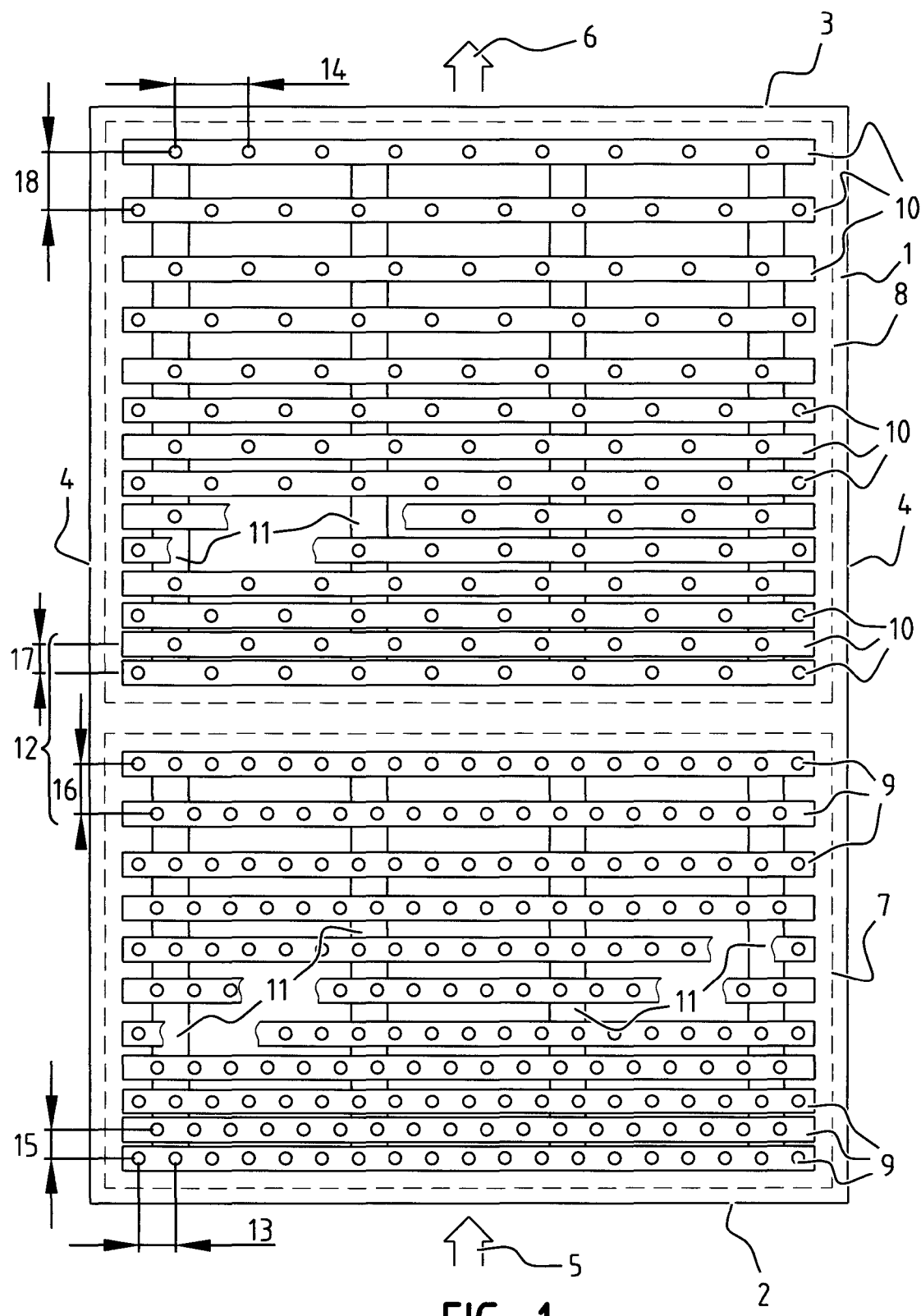
FIG. 1 shows a schematic top view of a cultivation system according to an embodiment of the invention.
Figure 5:
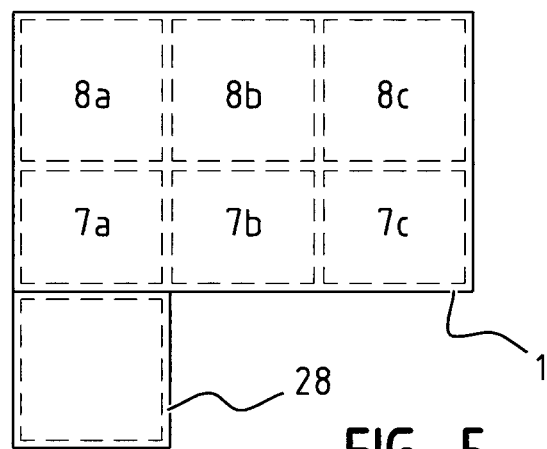
FIG. 5 shows a schematic illustration of a greenhouse with a plurality of systems according to the invention.

FIG. 1 shows a top view of a system for cultivating a crop according to an embodiment of the invention which is placed in a predetermined area 1. This predetermined area 1 is in practice preferably formed by a greenhouse or glasshouse or an outdoor installation. A section of a greenhouse or glasshouse can here also form the predetermined area, wherein another section of the greenhouse or glasshouse is used for other purposes. It is also possible for a plurality of systems for cultivating a crop according to the invention to be placed in one greenhouse or glasshouse, which is illustrated in FIG. 5. A first edge 2 and a second edge 3 can be defined in predetermined area 1. First edge 2 and second edge 3 are situated opposite each other and define a first direction extending from first edge 2 to second edge 3. This first direction is the direction in which the crop will move during cultivation. The predetermined area 1 further comprises lateral sides 4 which demarcate area 1. It is noted in this respect that gutters from another zone can likewise be transplanted to zone 2.

At the position of first edge 2 crop units of a crop are introduced into the system for cultivating the crop, this being designated schematically in the figure with arrow 5, and at the position of second edge 3 fully grown crop units are harvested and thereby removed from the system for cultivating a crop, this being designated schematically with arrow 6. The system for cultivating a crop comprises two zones, a first zone 7 adjacent to the first edge 2 of predetermined area 1 and a second zone 8 adjacent to the second edge 3 of predetermined area 1. First zone 7 and second zone 8 are further mutually adjacent at the position of a substantially centrally located section 12 of predetermined area 1. Substantially centrally located section is defined here as the location located at least a first distance removed from both first edge 2 and second edge 3, wherein the first distance is preferably at least 5% of the distance between first edge 2 and second edge 3, more preferably at least 10%. Substantially centrally thus does not imply that it must lie at the mathematical midpoint between the first edge and the second edge.

A plurality of gutters, designated respectively with reference numerals 9 and 10, are placed in both first zone 7 and second zone 8. Each gutter extends here substantially parallel to first edge 2 and second edge 3, and a guide 11 is provided for guiding gutters 9, 10 in the first direction. The first direction is substantially perpendicular to gutters 9, 10. In the embodiment of FIG. 1 guide 11 lies on a plurality of support profiles which are placed substantially horizontally (in the longitudinal direction from edge 2 to 3). In the transverse direction (direction of the gutters) the support profiles lie at an incline corresponding to the drainage of the gutters. The number of support profiles (from edge 2 to 3) can be adjusted here on the basis of the support requirements of the gutters. The support profiles are preferably interrupted in their longitudinal direction at the position of transition 12 from first zone 7 to second zone 8 such that gutters of first zone 7 can also remain in this first zone and can be carried back to first edge 2, while the gutters of second zone 8 can remain in this second zone and are carried back to transition 12 after harvesting at the position of second edge 3. The support profiles comprising guide 11 preferably have a flat upper side such that gutters 9, 10 can slide on the flat upper side of the support profiles. It is usually the case in practice that zone 2 is divided in two in respect of the guide system. The support profiles and therefore also the guide system change at the point of division.

The technical difference between first zone 7 and second zone 8 lies in the intermediate distance between adjacent crop units in the gutters. The intermediate distance 13 between crop units in gutters 9 of first zone 7 is particularly considerably smaller than the intermediate distance 14 between crop units in gutters 10 of second zone 8. Apart from this difference between intermediate distances 13 and 14, the technical construction and the operation of the system will be substantially the same in first zone 7 as in the second zone. Zone 7 now has only one driven pull rod system (due to the limited length).

Characteristic of this system with two zones 7 and 8 is that a transition 12 can be designated where at least part of the crop units are transplanted or transferred from one gutter to another gutter. In the exemplary embodiment as shown in FIG. 1, all crop units are transferred from gutter 9 at the position of transition 12 to one or more gutters 10 of second zone 8 at the position of the transition. This can take place automatically, mechanically or with intervention by a worker. In the embodiment of FIG. 1 gutters 9 remain in first zone 7 and are carried back to first edge 2. Gutters 10 of second zone 8 also remain in this zone, and when they reach the position of second edge 3 they are carried back to transition 12 and there filled once again. In an alternative embodiment the gutters continue from first zone 7 to second zone 8, and gutters are added at the position of transition 12 so that part of the crop units can be transferred or transplanted from the gutters in the first zone to the additional gutters in order to thus increase the intermediate distance between adjacent crop units in the gutters. For the sake of clarity the space between two crop units is in this description referred to with the term intermediate distance, while the space between two gutters is referred to with the term distance.

In each zone 7, 8 gutters 9, 10 move in the first direction such that a start and an end can be defined for each zone 7, 8, wherein the end of the zone is the section where the gutters arrive when they move in the first direction. At the position of the start of each zone 7, 8 gutters 9, 10 are positioned with a first distance between adjacent gutters 9, 10, which first distance is designated respectively with reference numerals 15 and 17. The first distance is minimal and, depending on the configuration of the system, can differ for first zone 7 and second zone 8. Distance between gutters is defined as the distance between the central axes of the gutters. The first distance 17 of gutters 10 in second zone 8 at the position of transition 12 is preferably greater than the width of the gutter+0 mm, preferably greater than the width of the gutter+5 mm (+1 mm), more preferably greater than the width of the gutter+10 mm, such that gutters 10 do not come into contact with each other at the position of transition 12. When gutters 10 in second zone 8 at the position of transition 12 are not pressed against each other, leaves of the crop are not pressed between adjacent gutters 10 either, such that the crop is not damaged. Advancing of gutters 10 during filling of the gutters or filling of at least part of the gutters along transition 12 is however considerably more difficult when gutters 10 may not be pressed against each other. This is further explained hereinbelow with reference to FIG. 7. At the position of the end of each zone 7, 8 gutters 9, 10 display a second distance between adjacent gutters, designated respectively with reference numerals 16 and 18, which is considerably greater than first distance 15, 17. The second distance is a predefined maximum distance and, depending on the configuration of the system, can differ for first zone 7 and second zone 8.

The distance between adjacent gutters is increased from the first distance 15, 17 to the second distance 16, 18 in stepwise manner or continuously between start and end of the zone, over the length of each zone 7, 8. The effect hereof is that the number of crop units per square metre decreases from the start of each zone toward the end of each zone. This has the result that the surface area per crop unit increases in each zone from the start toward the end, which allows each crop unit to grow and also to be given the surface area necessary for this purpose. The surface area at the start of each zone is optimally utilized here because the distance between the gutters is small when the crop units are also small and require less surface area per crop unit, and each crop unit is given sufficient space to grow in each zone because the distance between gutters increases from the start toward the end of each zone.

At the position of transition 12 the end of first zone 7 is adjacent to the start of second zone 8. The gutters of the first zone at the position of transition 12 will hereby display a considerably greater distance between adjacent gutters than gutters 10 of second zone 8 at the position of transition 12. Because of the combination of the considerable increase in the intermediate distance of crop units in one gutter in transition 12 from first zone 7 to second zone 8 and the considerable decrease in the distance between adjacent gutters along transition 12 from the first zone to second zone 8, the number of crop units per $m^2$ can remain substantially constant along the transition from first zone 7 to second zone 8. Substantially constant in this context is here defined above. Tests have shown that this way of working with two zones 7 and 8 allows a crop to be cultivated in considerably more efficient manner. The number of crop units per $m^2$ in predetermined area 1 can hereby decrease continuously and/or in stepwise manner from first edge 2 toward second edge 3. The crop units can be planted here at the position of first edge 2 at a number of crop units per $m^2$ which is optimized as a function of the size of the crop units which are planted. At the position of second edge 3 the crop units are harvested and each crop unit has reached full growth, and the number of crop units per $m^2$ is optimized as a function of the size of the fully grown crop units. This allows cultivation of a crop in a manner which optimizes surface area.

Figure 2:
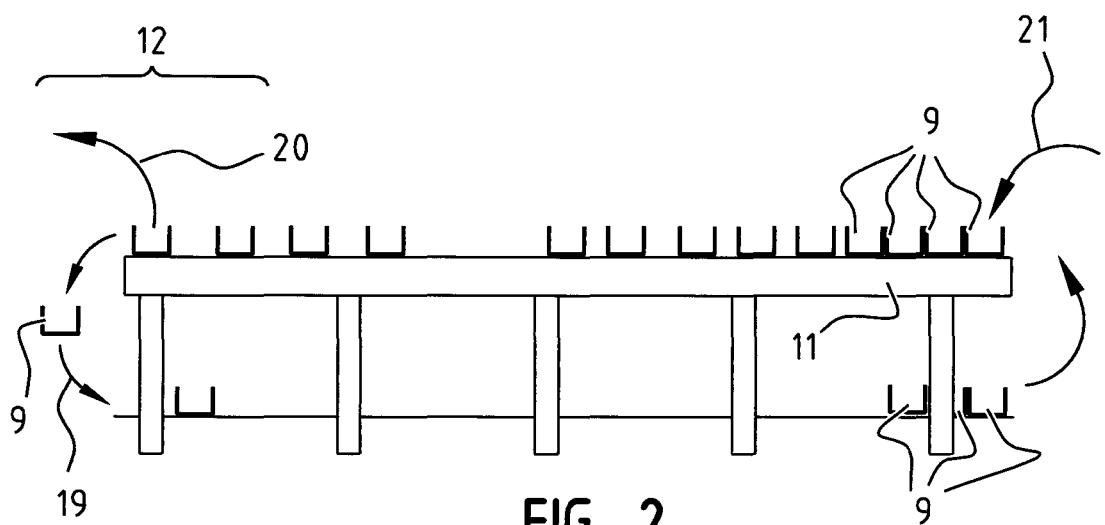
FIG. 2 shows a side view of a zone of a cultivation system of FIG. 1.

FIG. 2 shows a side view of a first zone 7 of the system of FIG. 1 and shows how gutters can be carried back to the start of the zone under guides 11, as indicated with arrow 19. The gutters are first emptied for this purpose, wherein crop units are first transplanted from gutters 9 of the first zone to gutters 10 of the second zone, which is indicated with arrow 20. Gutters 9 can then be carried via a transport system under guides 11 to the start of the first zone. At the position of the start of the first zone gutters 9 are placed onto the start of the first guide and filled with crop units. This is illustrated in the figure with arrow 21. The return of gutters 10 takes place under the guides.

Figure 3:
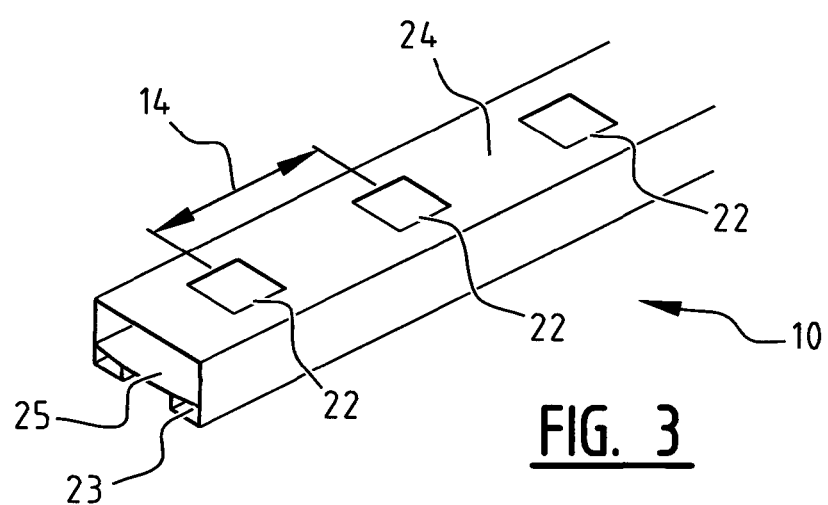
FIG. 3 shows a perspective view of a gutter for application in the cultivation system according to the invention.
Figure 6:
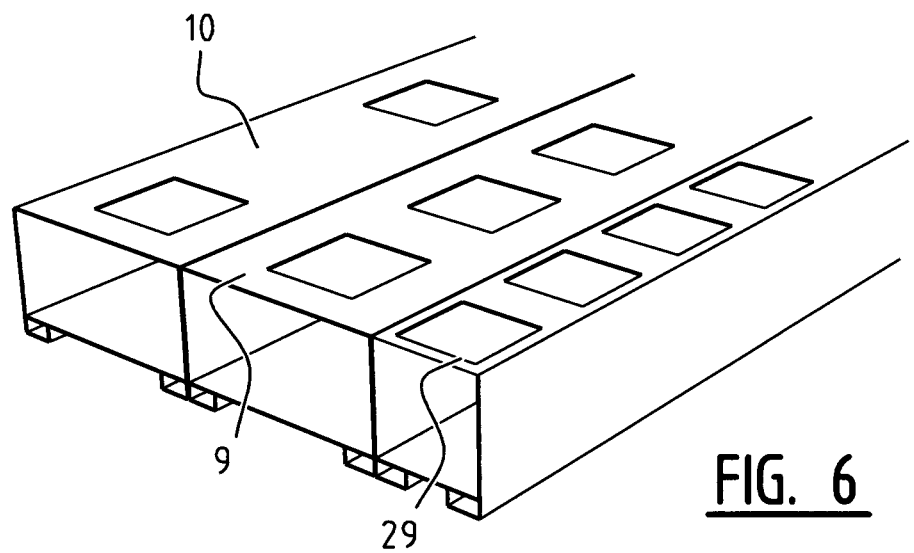
FIG. 6 shows different gutters from different zones of a preferred system according to the invention.
Figure 7:
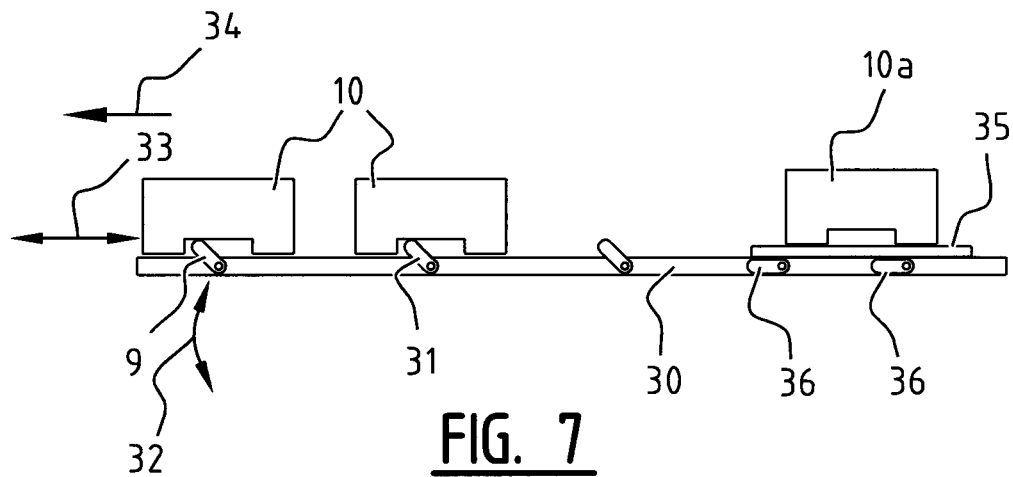
FIG. 7 shows a preferred drive system for application in the cultivation system according to the invention.

FIG. 3 shows a perspective view of a gutter 10 of the second zone. Each gutter 10 is preferably tubular or U-shaped in cross-section, with a substantially slightly curved underside 25 on the inner side (the nutrient solution thus runs centrally through the gutter), and wherein the gutter is preferably provided with downward protruding legs 23 extending in the longitudinal direction of gutter 10. Protruding legs 23 allow gutters 10 to be advanced in simple manner by means of a drive which is illustrated in FIG. 7. The tubular gutter requires no separate cover at the position where the U-shaped gutter is preferably provided on an upper side with a cover 24. A plurality of openings 22 are formed in the upper side or in these covers, wherein each opening is provided to receive one crop unit. Openings 22 can take on any dimensions and shape (round, oval, square, rectangular . . . ) and have an intermediate distance 14, as discussed at length above. Gutters 9 of first zone 7 are constructed in similar manner as the gutter shown in FIG. 3, however with an intermediate distance between openings 22 which is considerably smaller than the intermediate distance 14 shown in FIG. 3, which difference is illustrated in FIG. 6.

Figure 4:
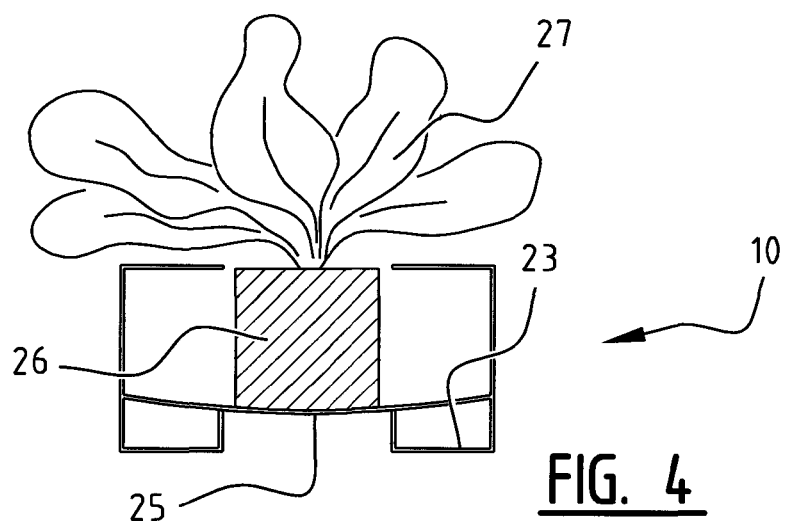
FIG. 4 shows a cross-section of a gutter with crop unit.

FIG. 4 shows a cross-section of a gutter 10 at the position of an opening 22 and shows a crop unit placed therein. The crop unit grows in a substrate (medium) 26. The roots of the crop grow in the medium but also outside the medium, on the bottom of the gutter. The crop has leaves and/or fruits 27. Leaves and/or fruits 27 typically extend above cover 24 here, while the medium with roots 26 extends substantially under cover 24. The advantage hereof is that the roots are shielded from the light. The water mixes with air and thereby takes up oxygen. The oxygen is very important for the growth of roots and plant. This manner of cultivating crops in gutters is generally known as NFT (Nutrient Film Technique), i.e. a thin film of nutrient solution flows through the gutter, in which the roots of the plant then develop, which is a form of hydroponics.

FIG. 5 shows a predetermined area 1 in which a plurality of systems according to the invention are placed and wherein a further area 28 is provided which is adjacent to the first edge of predetermined area 1. This further area 28 is provided with a system which is similar to the system of each of the zones 7, 8, whereby a third zone is created, also referred to as raising zone, which is provided just as the first zone and the second zone with a guide and with a plurality of raising gutters, wherein each raising gutter is provided to contain a plurality of crop units with an intermediate distance smaller than first intermediate distance 13 and wherein the further guide is provided to move the raising gutters in the direction of the first edge of predetermined area 1, while the distance between adjacent raising gutters increases. The same effect as described above in respect of transition 12 will hereby occur in a further transition from raising zone 28 to first zone 7. This means that the number of crop units per $m^2$ along the transition from the raising zone to the first zone can remain substantially constant. The surface area of further area 28 can also be optimally utilized.

Preferably situated preceding the raising zone is a sowing zone which is operatively connected to the raising zone so that crop units can be supplied from the sowing zone to an inlet of the raising zone. In the sowing zone the seeds are sown and placed in a germination space for a few days. This germination space can for instance be constructed under the guides so that space is optimally utilized. Constructing the germination space under the guides also facilitates the transition from the sowing zone to the raising zone. This is because the gutters can be introduced via a lift system from the sowing zone directly into the raising zone, where they are moved over guides to the first edge. In the raising zone the gutters will be positioned almost against each other at the start, and as the gutters are moved toward the first edge they can move apart in order to optimally utilize the surface area. The whole process from sowing to harvesting can thus take place in one single space.

Sowing of crop units in the gutters can be done by introducing a block of turf, in which sowing takes place, directly into the gutters. It is however alternatively possible to place a plug or pot in the gutters, wherein soil and/or growth medium is placed in the plug (the plug is a growth medium) or in the pot and the seeds then sown therein. Along the transition from one to another zone the pots or plugs can then be transferred, wherein the intermediate distance between the pots or plugs changes. With the addition of a raising zone and a sowing zone the cultivation of a crop comes full circle. The market gardener can control and manage the whole process from sowing to harvesting, which allows for considerable optimization.

FIG. 6 shows three gutters of three different zones 7, 8 and 28. The figure shows here a gutter 10 of second zone 8, a gutter 9 of first zone 7 and a gutter 29 of raising zone 28. The figure makes clear here that the intermediate distance between adjacent crop units in raising gutter 29 is considerably smaller than the intermediate distance between adjacent crop units in gutter 9 of the first zone (extended raising zone), and that this intermediate distance between the adjacent crop units in first zone 7 is considerably smaller than the intermediate distance between adjacent crop units in gutters 10 of second zone 8. In combination with the reduction in the distance between adjacent gutters 9, 10 and 29, this allows the number of crop units per $m^2$ to be kept substantially constant at each transition between zones.

FIG. 7 shows a preferred drive for application of the system according to the invention. It will be apparent here that different sorts and types of drive, including manual driving of the gutters wherein gutters are displaced manually, can be applied in order to execute the principle of the invention. A robotic system can also be used to advance the gutters. The preferred drive system of FIG. 7 comprises a drive rod 30, for instance a pull rod, with a plurality of catches 31. Drive rod 30 is provided to move forward and backward as indicated in the figure with arrow 33. A plurality of such drive rods, each time controlling a segment of the length of the system, are provided over the length of the system for cultivating a crop which extends from first edge 2 to second edge 3. A physical division of zone 2 and the resistance of materials usually determine the length of a pull rod or guide system.

Each of the catches 31 can be tilted between a lying position in which the catch extends substantially parallel to drive rod 30 and an at least partially upward position in which catch 31 extends at least partially above drive rod 30 so as to be able to hook behind a leg of a gutter and thus pull the gutter along in first direction 34. Catches 31 are here spring-loaded in upward direction such that they always tend to extend upward. When a downward force however engages on catches 31, catch 31 will tilt counter to the spring force and extend substantially lying. Such a disposition allows gutters 10 to be driven when drive rod 30 moves in first direction 34, while catches 31 extend upward and pull the gutters along. When the drive rod moves in the opposite direction, catches 31 will be pressed downward by gutters 10, counter to the spring force of catch 31, such that the gutters are not moved back. A one-way system for driving gutters is thus obtained hereby, wherein the distance between gutters can be changed in simple manner.

FIG. 7 shows on the right of the figure a further option wherein a part of drive rod 30 is covered at the top by a covering 35 which ensures that gutters 10a which are situated above the covering cannot be co-displaced in first direction 34 by catches. This allows a predetermined segment to be advanced in a zone, while another segment is intentionally not advanced due to covering 35. This option becomes particularly relevant when the harvesting at second edge 3 of predetermined area 1 and the planting and/or transplanting in respectively first edge 2 and transition 12 do not take place simultaneously.

Harvesting and not simultaneously transplanting (along transition 12) creates a gap in zone 8, which is filled once again during planting and/or transplanting. Closing of this gap then typically takes place by means of a drive rod connected to a drive chain in combination with a drive rod which starts at transplanting zone 12 and ends N gutters past cover plate 35. The drive rod connected to a chain is typically situated in a starting position under the gutters at the position of covering 35. During harvesting the gutters will be co-displaced by the drive rods ending at the second edge and starting at covering 35. A gap, which has to be filled during transplanting, will result behind cover plate 35. In order to fill the gap the pull rod on the chain will first move forward N positions so that the catches are pulled past cover plate 35 and extend upward. The drive rod which starts at transplanting zone 12 will then push N gutters past the cover plate. This process is repeated until the chain has moved the gutters over the whole gap. A gap in a field with gutters can thus be filled without gutters having to be pushed against each other.

The drive as shown in FIG. 7 provides many options for designing and controlling the gutters in their movement in the first direction. This drive of FIG. 7 particularly allows gutters to be added at the start of a zone, without these gutters having to be pushed against each other. The drive allows these gutters to be pulled along with a distance between adjacent gutters, wherein no leaves can be pressed between adjacent gutters, as already stated above.

Figure 8:
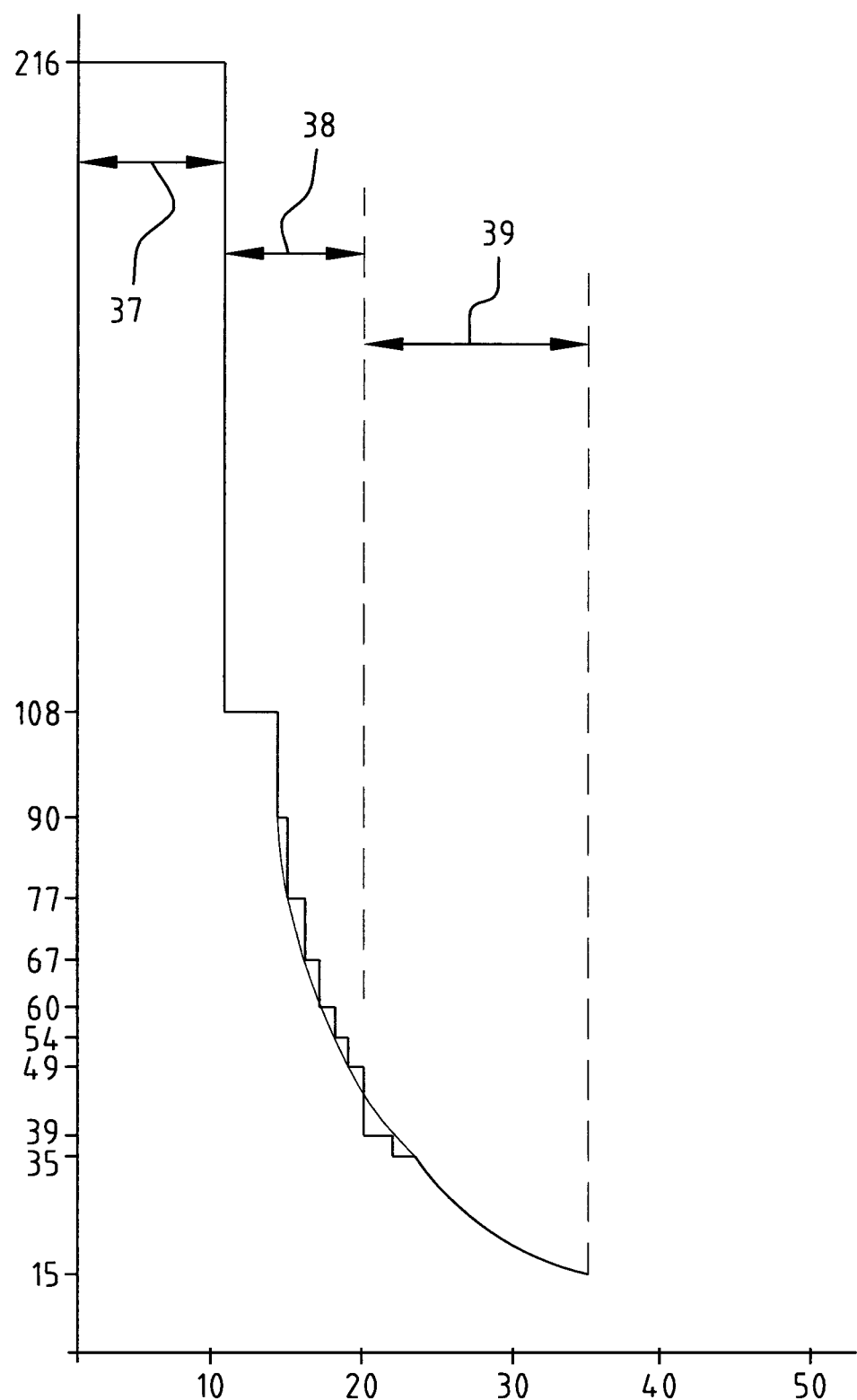
FIG. 8 shows a graph which illustrates the effect of the cultivation system according to the invention.

FIG. 8 shows a graph which displays the effect of the use of a system as shown in FIG. 1. The graph shows the number of days a crop has been growing on the horizontal axis, while the number of crop units per $m^2$ is shown on the vertical axis. The values included in the graph are only an example, and it will be apparent that these values can differ considerably depending on the type of crop. The principles shown by this graph are however characteristic of the system according to the invention and are therefore generally applicable. The figure shows three stages, wherein first stage 37 indicates the raising stage. In the example of FIG. 8 crop units are planted in the raising gutter at a rate of 216 crop units per $m^2$.

After raising stage 37 the crop units are transplanted from gutters 29 to gutters 9 (extended raising stage zone 7) at the position of first edge 2, where gutters 9 are then situated close together such that 108 crop units per $m^2$ are situated in gutters 9 at the position of first edge 2. By increasing the distance between adjacent gutters in first zone 7, in the example of FIG. 8 in steps, the number of crop units per $m^2$ systematically decreases to 49 crop units per $m^2$ when gutters 9 are at the position of transition 12. The crop units are then transferred or transplanted to gutters 10 in second zone 8 at, in the example of FIG. 8, a rate of 38 crop units per $m^2$. This number of crop units of 38 per $m^2$ is obtained while the gutters in second zone 8 are situated close together, this by considerably increasing the intermediate distance between adjacent crop units in gutter 10 relative to first zone 7. By increasing the distance between the gutters in second zone 8 while the gutters are moving from transition 12 to second edge 3, the number of crop units per $m^2$ decreases systematically in order to give the crop space to reach full growth. At the position of second edge 3 the crop units have a density of about 15 crop units per $m^2$, crop units have reached full growth, and can be harvested. The surface area of predetermined area 1 is in this way optimally utilized.

Figure 9:
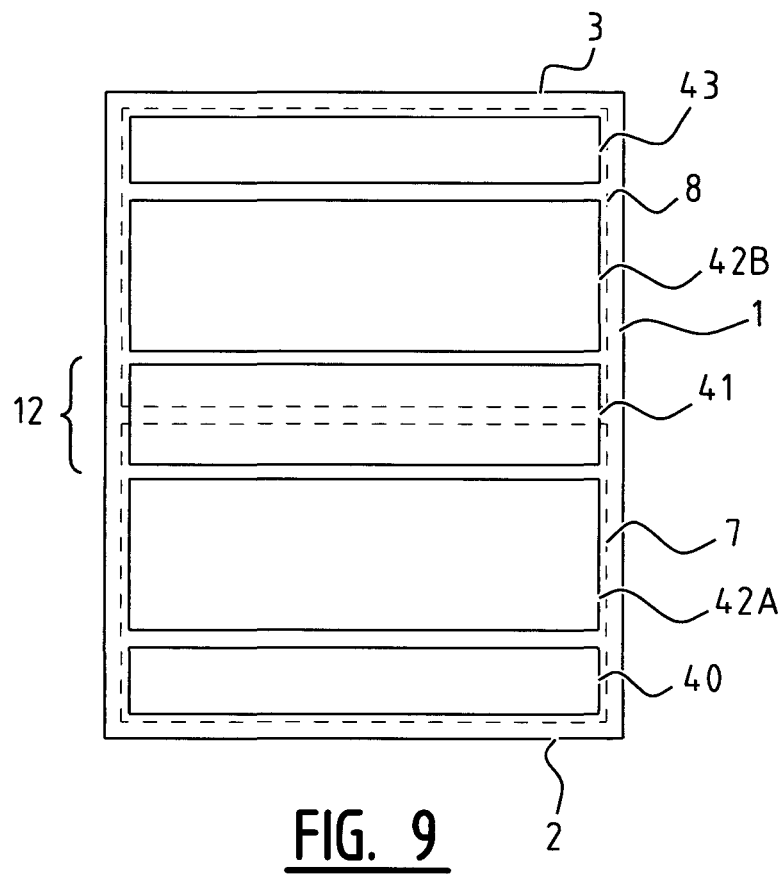
FIG. 9 shows a schematic top view of a cultivation system according to a further aspect of the invention.

FIG. 9 shows a top view of a system for cultivating a crop similar to FIG. 1. The principles which are elucidated hereinbelow can be applied in combination with and in addition to the above stated system with gutters. These principles can however also be applied separately thereof, as will be understood by the skilled person. FIG. 9 has for its object to further elucidate further aspects of the invention. FIG. 9 thus shows a sowing unit 40 at the position of first edge 2 of predetermined area 1. The figure shows a transfer unit 41 at the position of transition 12. The figure further shows a first transport system in first zone 7, with reference numeral 42A. This transport system can for instance be formed by the guides with gutters as shown in previous figures and as described above. The figure shows in second zone 8 a second transport system 42B which can for instance likewise be formed by a plurality of gutters as described above and shown in previous figures. FIG. 9 further shows a harvesting unit 43 for harvesting the crop. The different units, i.e. sowing unit 40, transport systems 42 and transfer unit 41, are formed here such that they determine the orientation of the crop units in a predetermined manner. During sowing the orientation can be determined by placing the seeds at predetermined positions in the substrate unit, which is further explained with reference to FIG. 10. The orientation of the substrate unit or crop unit is then preferably controlled by each of the units. Control is understood here to mean that the orientation can be kept the same or can be changed according to a predetermined orientation progression.

The sowing unit is provided to sow directly in gutters. The advantages hereof are explained above. The sowing unit is further operatively connected to the first zone. This means that the sowing unit can be placed at the first edge of the first zone, but this also means that the sowing unit can be positioned at a distance from the first zone with a transport system between the sowing unit and the first zone, so that the substrate units sown by the sowing unit ultimately come to lie in the first zone.

A crop unit is defined as a substrate unit in which one or more crop seeds have been sown. When a crop seed germinates and grows, a plant forms. Because one substrate unit can comprise a plurality of crop seeds, one crop unit can also comprise a plurality of plants.

Figure 10:
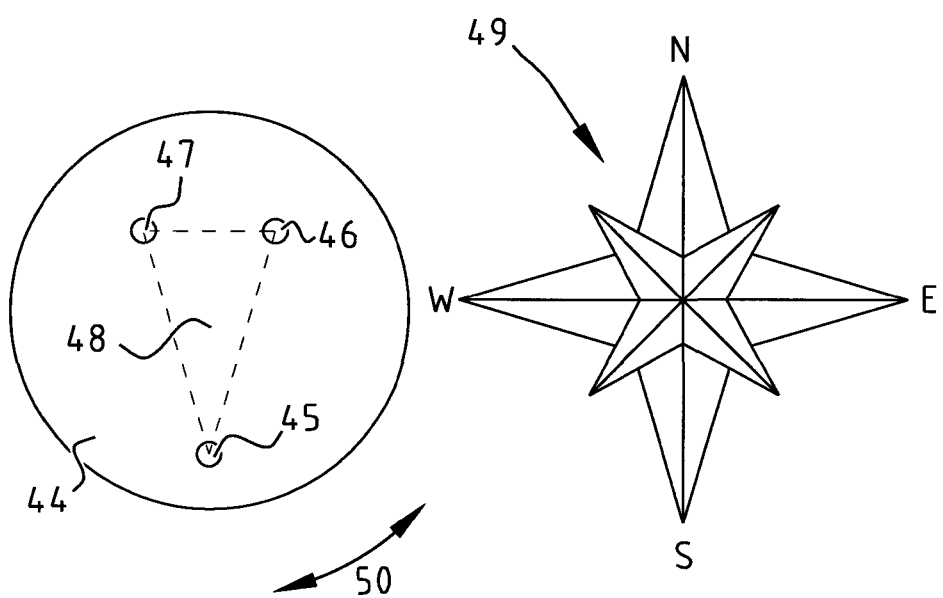
FIG. 10 shows a top view of a substrate unit in which a plurality of crop seeds are sown with a predetermined mutual distance and orientation.

FIG. 10 shows a substrate unit 44 in which three crop seeds 45, 46, 47 have been sown. The three crop seeds 45, 46, 47 are sown at a predetermined distance from each other and with a predetermined orientation. Predetermined orientation is understood here to mean that the relative position of the seeds relative to the north 49 is predetermined. Crop seed 45 is thus sown toward the south, while crop seeds 46 and 47 are sown more toward the east and west in substrate unit 44. In the example of FIG. 10 crop seed 45 is for instance of a type of crop with a slower growth curve than crop seeds 46 and 47. Crop seeds 46 and 47 for instance have substantially the same growth curve, whereby they are sown in substrate unit 44 at the same position relative to the south. The seeds are sown in an isosceles triangle 48 relative to each other. The seeds can alternatively also be sown in an equilateral triangle. The orientation progression of substrate unit 44 with the plurality of crop seeds and/or crop plants is illustrated with FIG. 50 and relates to the manner in which the orientation can be changed during cultivation of the crop. According to a simple embodiment, the orientation remains identical and the substrate unit does not rotate during transport or during the transition from the first zone to the second zone. Substrate unit 44 can alternatively be rotated at predetermined moments in the cultivation process in order to obtain an orientation progression with orientation variations. This allows the growth curves of the different plants in the substrate unit to be influenced by directing one of the plants toward the sun, i.e. toward the south. This allows crop units with a plurality of crop types to be optimally cultivated.

The skilled person will be able to understand the operation and advantages of the invention, as well as the different embodiments thereof, on the basis of the figures and the description. It will be apparent here that the description and the figures are intended solely for the purpose of understanding the invention and not to limit the invention to a few embodiments or examples used therein. It is therefore stressed that the scope of protection will be defined solely in the claims.

The invention claimed is:

1. A system for cultivating a crop, comprising:
a sowing unit for sowing at least one crop seed per substrate unit; and
a guide for guiding a plurality of gutters, wherein each gutter is provided to contain a plurality of substrate units with an intermediate distance in the longitudinal direction of the gutter;
wherein the sowing unit is provided to sow the at least one crop seed in the substrate unit and wherein the substrate unit is situated in the gutter during germination of the at least one crop seed;
wherein the guide comprises a drive for moving the gutters in a first direction, wherein the drive is provided to change the distance between adjacent gutters in the first direction.

2. The system as claimed in claim 1, wherein the sowing unit is provided to sow the at least one crop seed in the substrate unit when the substrate unit is situated in the gutter.

3. The system as claimed in claim 1, wherein the plurality of gutters are situated in a predetermined area, and wherein the guide is provided to guide the gutters in the first direction which extends from a first edge to a second edge of the area, wherein the area comprises a first zone adjacent to the first edge and a second zone adjacent to the second edge, wherein the system further comprises:
a harvesting unit for harvesting the crop;
a transfer unit for transferring a plurality of substrate units from the first zone to the second zone;
wherein the first zone operatively connects the sowing unit and the transfer unit at least partially; and
wherein the second zone operatively connects the transfer unit and the harvesting unit at least partially.

4. The system as claimed in claim 3, wherein the sowing unit is configured to sow at least two crop seeds in the substrate unit with a predetermined mutual distance and orientation, and wherein the gutters and the transfer unit are configured to respectively transport and transfer the plurality of substrate units in a manner such that the substrate units display a predetermined orientation progression from the sowing unit to the harvesting unit.

5. The system as claimed in claim 3, wherein the system further comprises a raising zone with a further guide for guiding a plurality of raising gutters in a further area adjacent to the first edge, wherein each raising gutter is provided for containing a plurality of the substrate units with a further intermediate distance which is considerably smaller than the intermediate distance in the first zone, wherein the sowing unit is operatively connected to the raising zone.

6. The system as claimed in claim 1, wherein the gutters are arranged and configured at an angle to allow water to flow through the gutter and wherein the system comprises at the position of one end of the gutters a water dosing system and at the position of another end of the gutters a water collecting system.

7. The system as claimed in claim 6, wherein the water collecting system is operatively connected to the water dosing system such that water can be recuperated.

8. A method for cultivating a crop, comprising:
sowing at least one crop seed per substrate unit by means of a sowing unit; and
guiding a plurality of gutters by means of a guide, wherein each gutter is provided to contain a plurality of substrate units with an intermediate distance in the longitudinal direction of the gutter;

wherein the sowing unit is provided to sow the at least one crop seed in the substrate unit and wherein the substrate unit is situated in the gutter during germination of the at least one crop seed;

wherein the guide comprises a drive for moving the gutters in a first direction, wherein the drive is provided to change the distance between adjacent gutters in the first direction.

9. The method as claimed in claim 8, wherein the sowing unit is provided to sow the at least one crop seed in the substrate unit when situated in the gutter.

10. The method as claimed in claim 8, wherein the plurality of gutters are situated in a predetermined area, and wherein the guide is provided to guide the gutters in the first direction which extends from a first edge to a second edge of the area, wherein the area comprises a first zone adjacent to the first edge and a second zone adjacent to the second edge, and wherein the method further comprises:

harvesting the crop by means of a harvesting unit; and transferring a plurality of substrate units from the first zone to the second zone by means of a transfer unit;

wherein the first zone operatively connects the sowing unit and the transfer unit at least partially; and wherein the second zone operatively connects the transfer unit and the harvesting unit at least partially.

\* \* \* \* \*